United States Patent
Tada

(10) Patent No.: US 9,845,127 B2
(45) Date of Patent: Dec. 19, 2017

(54) PART ATTACHMENT STRUCTURE OF STRADDLE TYPE VEHICLE

(71) Applicant: HONDA MOTOR CO., LTD., Tokyo (JP)

(72) Inventor: Masashi Tada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/221,765

(22) Filed: Jul. 28, 2016

(65) Prior Publication Data

US 2017/0029062 A1 Feb. 2, 2017

(30) Foreign Application Priority Data

Jul. 30, 2015 (JP) .................................. 2015-151248

(51) Int. Cl.
*B62J 1/08* (2006.01)
*B62J 1/12* (2006.01)
*B62K 11/04* (2006.01)

(52) U.S. Cl.
CPC . *B62J 1/08* (2013.01); *B62J 1/12* (2013.01); *B62K 11/04* (2013.01)

(58) Field of Classification Search
CPC ........ B62K 19/30; B62K 11/02; B62K 11/04; B62J 1/08
See application file for complete search history.

(56) References Cited

U.S. PATENT DOCUMENTS

2014/0167387 A1* 6/2014 Komatsu .................... B62J 7/04
280/288
2016/0288851 A1* 10/2016 Tada ......................... B62J 1/08

FOREIGN PATENT DOCUMENTS

JP 2013-71682 A 4/2013

* cited by examiner

*Primary Examiner* — Kevin Hurley
(74) *Attorney, Agent, or Firm* — Westerman, Hattori, Daniels & Adrian, LLP

(57) ABSTRACT

Attachment and detachment work of a detachable part is facilitated, while achieving secure attachment thereof, in a part attachment structure of straddle type vehicle including the detachable part attached to a body frame. A seat supporting member includes a base portion spanning paired right and left seat frames, and paired right and left extension portions, which are displaceable in the lateral direction, and extend in the longitudinal direction along the paired right and left seat frames, respectively, from the base portion; the base portion is fixed by being fastened to a body frame; each of the paired right and left extension portions includes an upper locking portion, both lateral locking portions, and a lower locking portion; and the lock on the seat frames is engaged or released by only moving the extension portions in two directions.

14 Claims, 9 Drawing Sheets

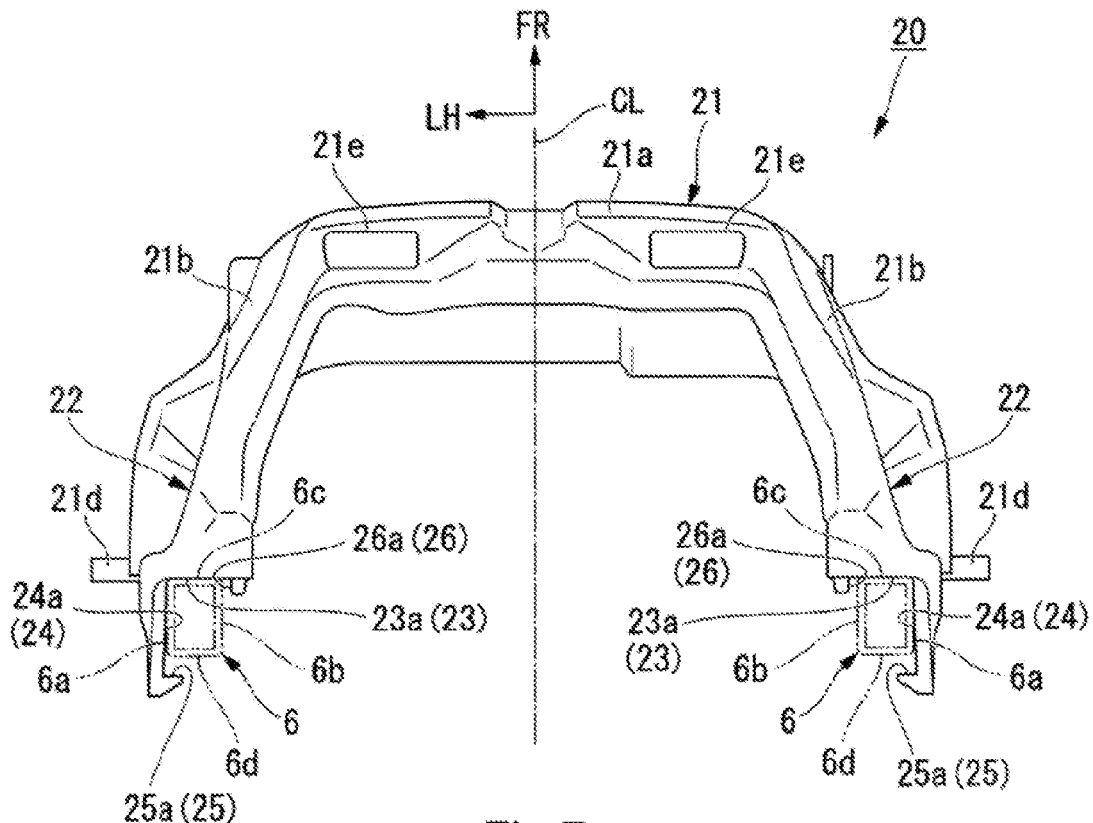
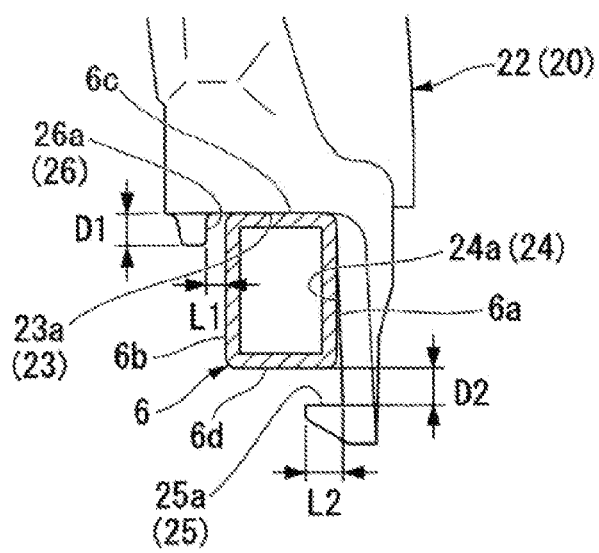

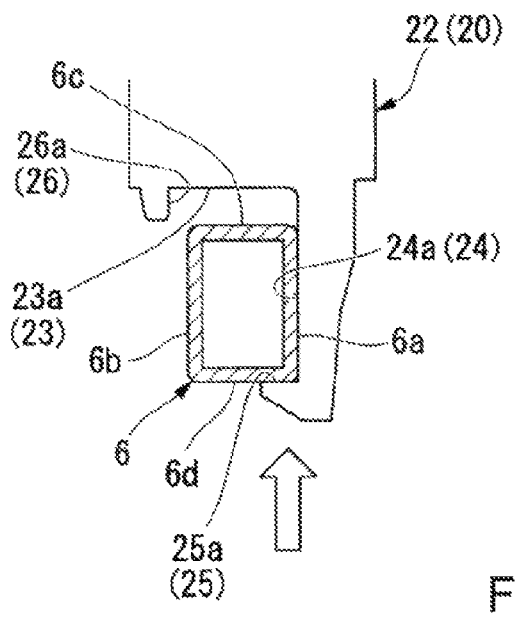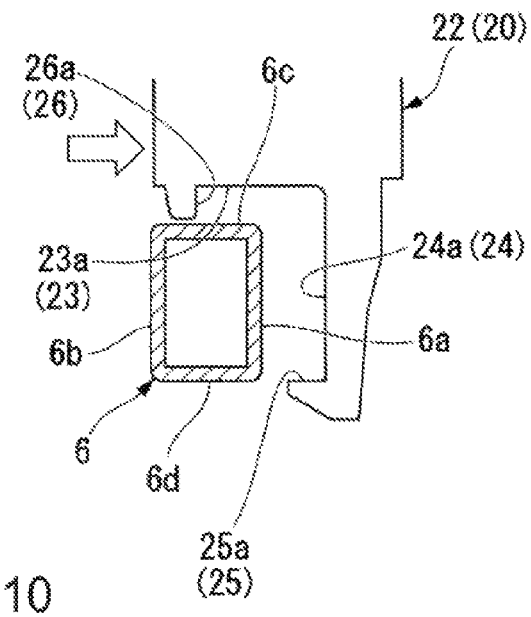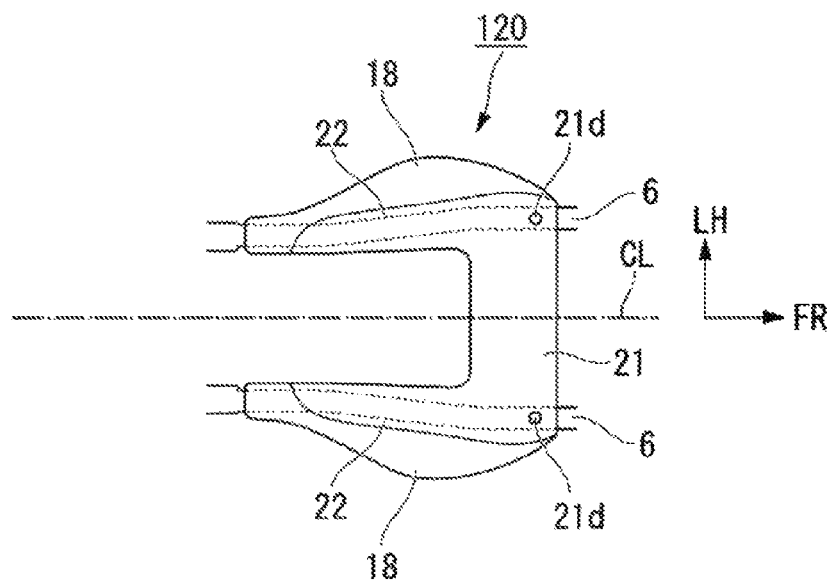

PART ATTACHMENT STRUCTURE OF STRADDLE TYPE VEHICLE

TECHNICAL FIELD

The present disclosure relates to a part attachment structure of a straddle type vehicle.

BACKGROUND

Japanese Patent Application Publication No. 2013-71682 discloses a structure of a straddle type vehicle, in which resin parts such as a side cover and a rear fender are detachably attached to paired right and left frame members of a body frame. The detachable feature of the resin parts enables maintenance of functional parts covered with the resin parts.

SUMMARY

In the structure of attaching detachable parts such as the resin parts to a body frame, there is a need to reduce the number of fastening parts between the detachable part and a frame member to facilitate attachment and detachment work of the detachable part, while achieving secure attachment of the detachable part.

In view of the foregoing, it is desirable to facilitate attachment and detachment work of a detachable part, while achieving secure attachment of the detachable part, in a part attachment structure of a straddle type vehicle including the detachable part attached to a body frame.

A first aspect of the embodiments includes: a body frame (2) having paired right and left frame members (6) extending in the longitudinal direction; and a detachable part (20) supported by the paired right and left frame members (6), and is characterized in that: the detachable part (20) includes a base portion (21) straddling the paired right and frame members (5), and paired right and left extension portions (22), which are displaceable in the lateral direction and extend in the longitudinal direction along the paired right and left frame members (6), respectively, from the base portion (21); the base portion (21) is fixed by being fastened to the body frame (2); and each of the paired right and left extension portions (22) includes an upper locking portion (23) placed on top of each of the frame members (6), a first lateral locking portion (24) extending downward from one side in the lateral direction of the upper locking portion (23), and arranged such that it can come into contact with a first side surface (6a) on one side in the lateral direction of each of the frame members (6), a lower locking portion (25) extending on the other side in the lateral direction from a lower end of the first lateral locking portion (24), and arranged below each of the frame members (6) with a gap (D2) formed therebetween in the vertical direction, and a second lateral locking portion (26) extending downward from the other side in the lateral direction of the upper locking portion (23), for the same distance as the gap (D2) or for a shorter distance than the gap (D2), and arranged such that it can come into contact with a second side surface (6b) on the other side in the lateral direction of each of the frame members (6).

Note that the straddle type vehicle includes general vehicles that the rider rides by straddling the vehicle body, and includes not only motorcycles (including a motor bicycle and a scooter type vehicle), but also three-wheeled (including vehicles two-wheeled at the front and single-wheeled at the rear, as well as those single-wheeled at the front and two-wheeled at the rear) or four-wheeled vehicles.

A second aspect of the embodiments is characterized in that in each of the frame members (6), the first side surface (6a) and second side surface (6b) onto which the respective lateral locking portions (24, 26) are locked are vertical surfaces, which are formed along the vertical direction and extend to the upper end of said frame member (6).

A third aspect of the embodiments includes a seat (14) on which a rider sits, and is characterized in that the detachable part (20) is arranged below the seat (14).

A fourth aspect of the embodiments is characterized in that: the detachable part (20) is an integrally molded part made of resin; and the second lateral locking portion (26) is provided in such a manner as to avoid the lower locking portion (25) in the longitudinal direction.

A fifth aspect of the embodiments is characterized in that the second lateral locking portion (26) is separated toward the base portion (21) from the lower locking portion (25).

A sixth aspect of the embodiments includes a volume securement part (15) between the paired right and left frame members (6), and is characterized in that the second lateral locking portion (26) extends downward from the inner side in the lateral direction of the upper locking portion (23), and locks onto the second side surface (6b) on the inner side in the lateral direction of the frame member (6).

A seventh aspect of the embodiments is characterized in that: the base portion (21) includes a fastening part to be fastened to the body frame (2) with a fastening bolt (B1); and the fastening part is a bolt insertion portion (21d) into which the fastening bolt (B1) is insertable.

According to the first aspect, when the detachable part is attached to the body frame, the base portion is fastened and fixed to the body frame, and the right and left extension portions are placed on the respective frame members while being restricted from moving in the lateral direction. Upward movement of each extension portion is restricted by load from above, and even if the extension portion is lifted, the amount of upward movement is limited within the gap by the lower locking portion.

Meanwhile, when detaching the detachable part from the body frame, first, fastening of the base portion is released, and the extension portion is lifted until the lower locking portion comes into contact with the lower surface of the frame member, and is displaced to the opposite side of the second lateral locking portion (first lateral locking portion side) in the lateral direction. By further lifting the right and left extension portions, the right and left extension portions can be detached from the right and left frame members, and the entire detachable part can be detached from the body frame. That is, as compared to a case of fastening the right and left extension portions, the detachable part can be detached without having to release fastening of the right and left extension portions.

Thus, the detachable part can be securely attached to the body frame through less work of attaching and detaching fasteners such as bolts, and attachment and detachment can be facilitated.

According to the second aspect, the respective lateral locking portions can be locked onto both of the side surfaces extending vertically downward from the upper end of the frame member, whereby lateral movement of each extension portion can be restricted favorably. Also, the extension portions, and therefore the entire detachable part can be moved vertically along both of the side surfaces of the frame members, so that the detachable part can be attached and detached easily.

According to the third aspect, since the bifurcated detachable part is less exposed, appearance can be improved, and the extension portions can be kept from being thrown off the frame members by unintentional external pressure applied thereon.

According to the fourth aspect, the second lateral locking portion and the lower locking portion are less likely to block removal of each other's mold, and therefore the second lateral locking portion and the lower locking portion can be formed more easily.

According to the fifth aspect, when releasing the lock of the second lateral locking portion, first, the detachable part is rotated about the lower locking portion in such a manner as to lift the base portion side of the detachable part. This releases the lock of the second lateral locking portion on the frame side surface, the second lateral locking portion being separated toward the base portion from the lower locking portion. By moving the extension portion in the lateral direction in this state, the lock of the lower locking portion on the frame lower surface is released. Since the lock of the second lateral locking portion is released by thus using the rotation of the detachable part, the lock of the second lateral locking portion can be released without separating the lower locking portion largely from the frame member.

According to the sixth aspect, when releasing the lock of the lower locking portion after releasing the lock of the second lateral locking portion, the extension portion is displaced outward in the lateral direction. Accordingly, there is no need to secure a margin on the volume securement part side to move the extension portion, so that the largest possible volume of the volume securement part can be secured.

According to the seventh aspect, the configuration of the fastening part of the base portion is simplified, and therefore the detachable part can be lifted more easily, and can be attached and detached smoothly. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

FIG. 6 is a rear view of the seat supporting member.

FIG. 7 is an enlarged view of a main part of FIG. 6.

FIGS. 9(a) and 9(b) show cross-sectional views corresponding to FIG. 7 for describing the detachment procedure of the seat supporting member, where 9(a) shows an extension portion moved upward, and 9(b) shows the extension portion moved further to the outer side in the lateral direction, from the state in 5(a).

FIG. 10 is a top view of a first modification of the seat supporting member.

DETAILED DESCRIPTION

Figure 1:
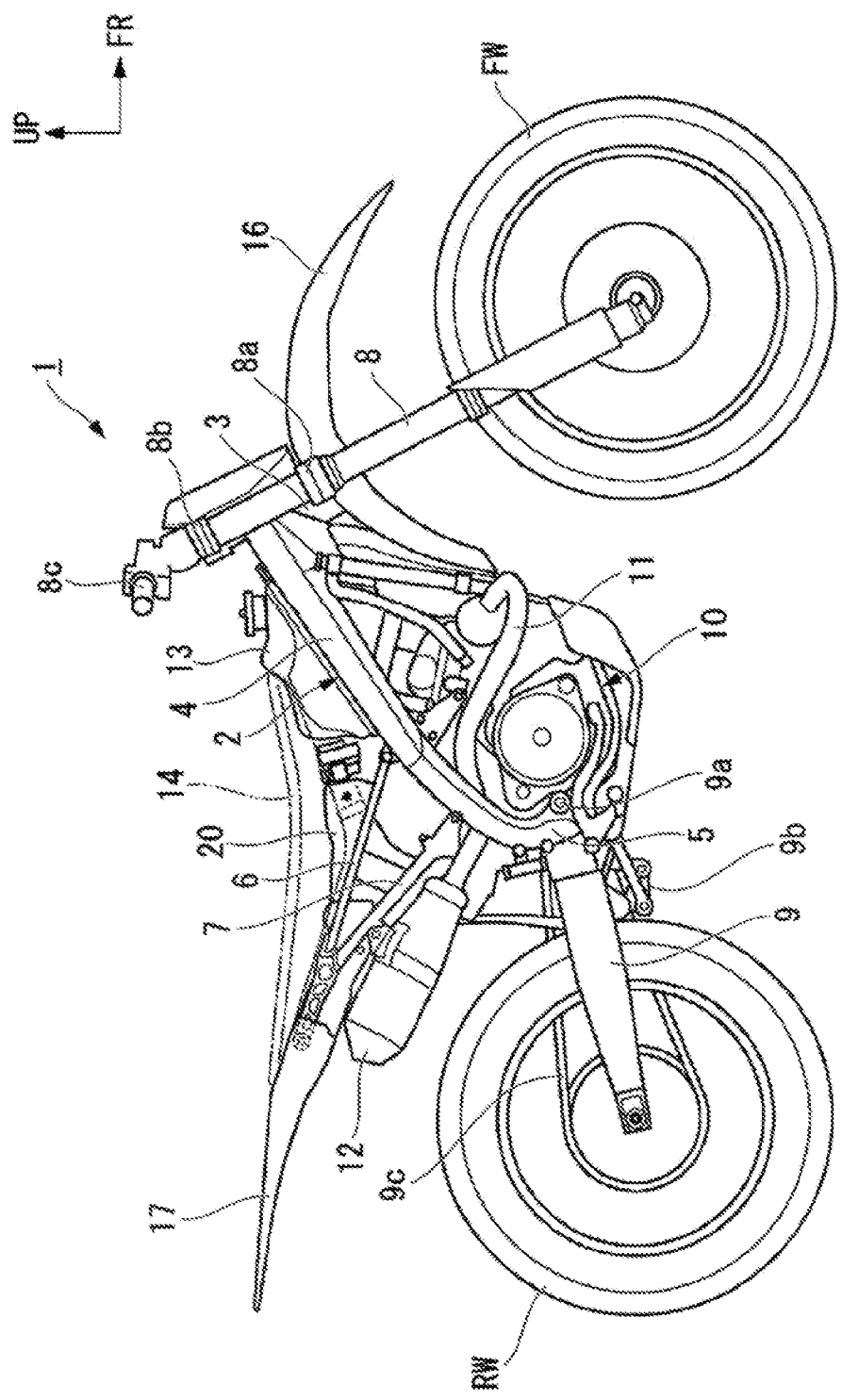
FIG. 1 is a right side view of a motorcycle of an embodiment of the present application.

Hereinafter, an exemplary embodiment of the present application will be described with reference to the drawings. Note that in the following description, directions such as front and rear and right and left are the same as those of a vehicle described below, if not otherwise specified, in addition, arrow FR indicating the front of the vehicle, arrow LH indicating the left of the vehicle, and arrow UP indicating the upper direction of the vehicle are shown in appropriate parts of the drawings used in the following description. In the drawings, line CL indicates the lateral centerline of the vehicle body.

As shown in FIG. 1, a body frame 2 of a motorcycle 1 (straddle type vehicle) includes paired right and left main frames 4 extending downward toward the rear from a head pipe 3, paired right and left pivot frames 5 connected to rear lower parts of the right and left main frames 4, paired right and left seat frames 6 extending upward toward the rear from rear end parts of the right and left main frames 4, and paired right and left support frames 7 extending upward toward the rear from the right and left pivot frames 5 and connected to rear end parts of the right and left seat frames 6. An engine 10 is installed below the right and left main frames 4 and in front of the right and left pivot frames 5.

In a front part of the vehicle body, paired right and left front forks 8 are steerably supported to the head pipe 3, through a stem 8a. A front wheel FW is pivotally supported to lower end parts of the right and left front forks 8. A bar handle 8c is attached to a top bridge 8b at the upper end of the stem 8a.

In a rear part of the vehicle body, a front end part of a swing arm 9 is supported to the right and left pivot frames 5 through a pivot shaft 9a, in a vertically swingable manner. A rear wheel RW is pivotally supported to a rear end part of the swing arm 9. A rear cushion mechanism 9b is interposed between a front part of the swing arm 9 and the right and left pivot frames 5. The rear wheel RW and the engine 10 are connected through a chain type driving mechanism 9c.

A fuel tank 13 is arranged between the right and left main frames 4. A rider's seat 14 is arranged behind the fuel tank 13 and above the right and left seat frames 6. The seat 14 is supported by the right and left seat frames 6 from below, and has a front end part supported by a rear part of the fuel tank 13 from below. A middle part in the longitudinal direction of the seat 14 is supported by the right and left seat frames 6 from below, through a later mentioned seat supporting member 20. An air cleaner 15 is arranged between the right and left seat frames 6. In FIG. 1, reference numeral 11 indicates an exhaust pipe of the engine 10, and reference numeral 12 indicates a muffler attached to the rear end of the exhaust pipe 11.

The motorcycle 1 includes, as synthetic resin cover members, parts such as a front fender 16 covering an upper part of the front wheel FW, a rear fender 17 covering an upper part of the rear wheel RW, paired right and left side covers 18 (see FIG. 3) covering side surfaces of the vehicle body, and a tank cover (not shown) covering the periphery of the fuel tank 13.

Figure 2:
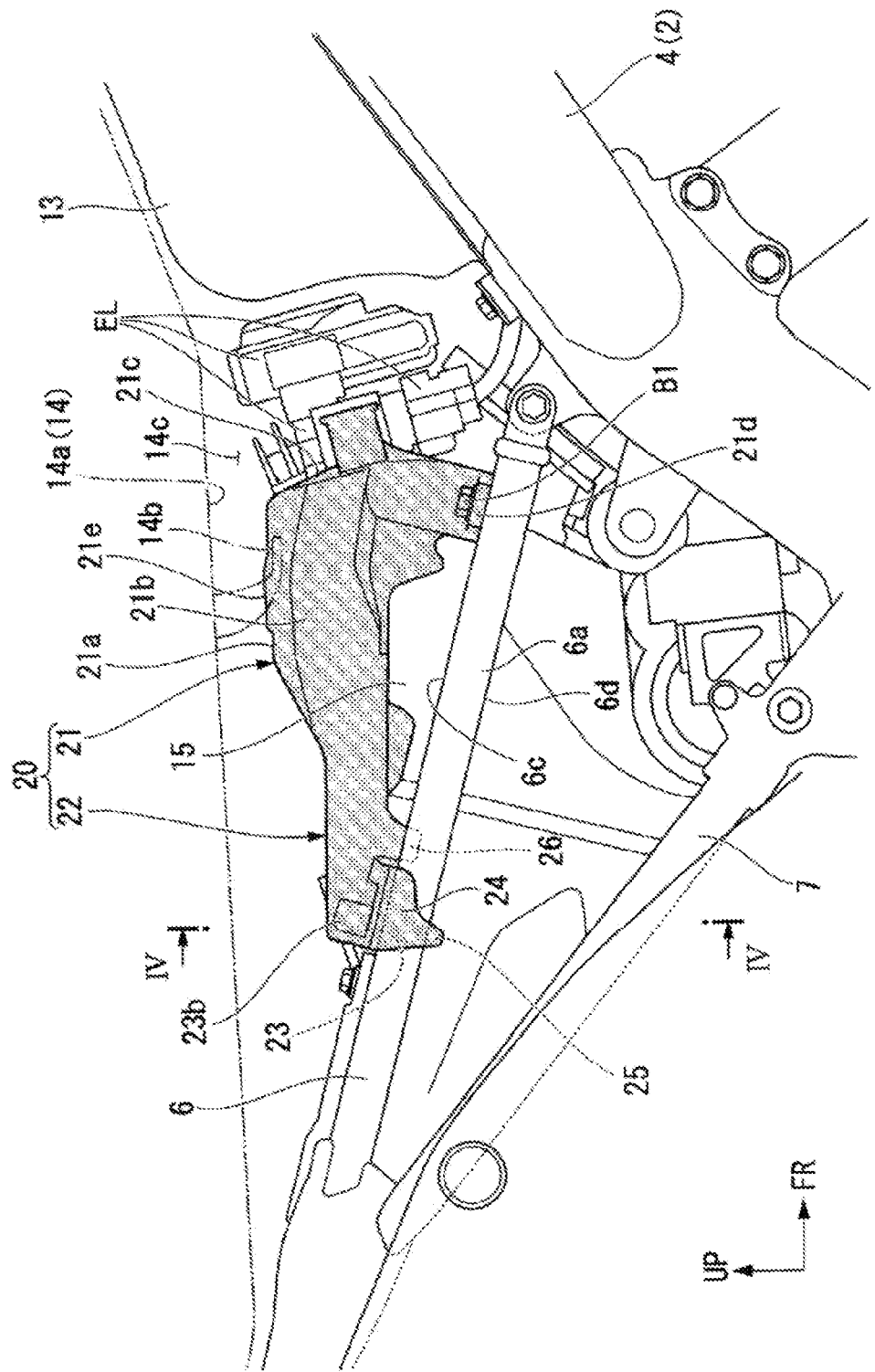
FIG. 2 is a right side view of a main part of the motorcycle.
Figure 3:
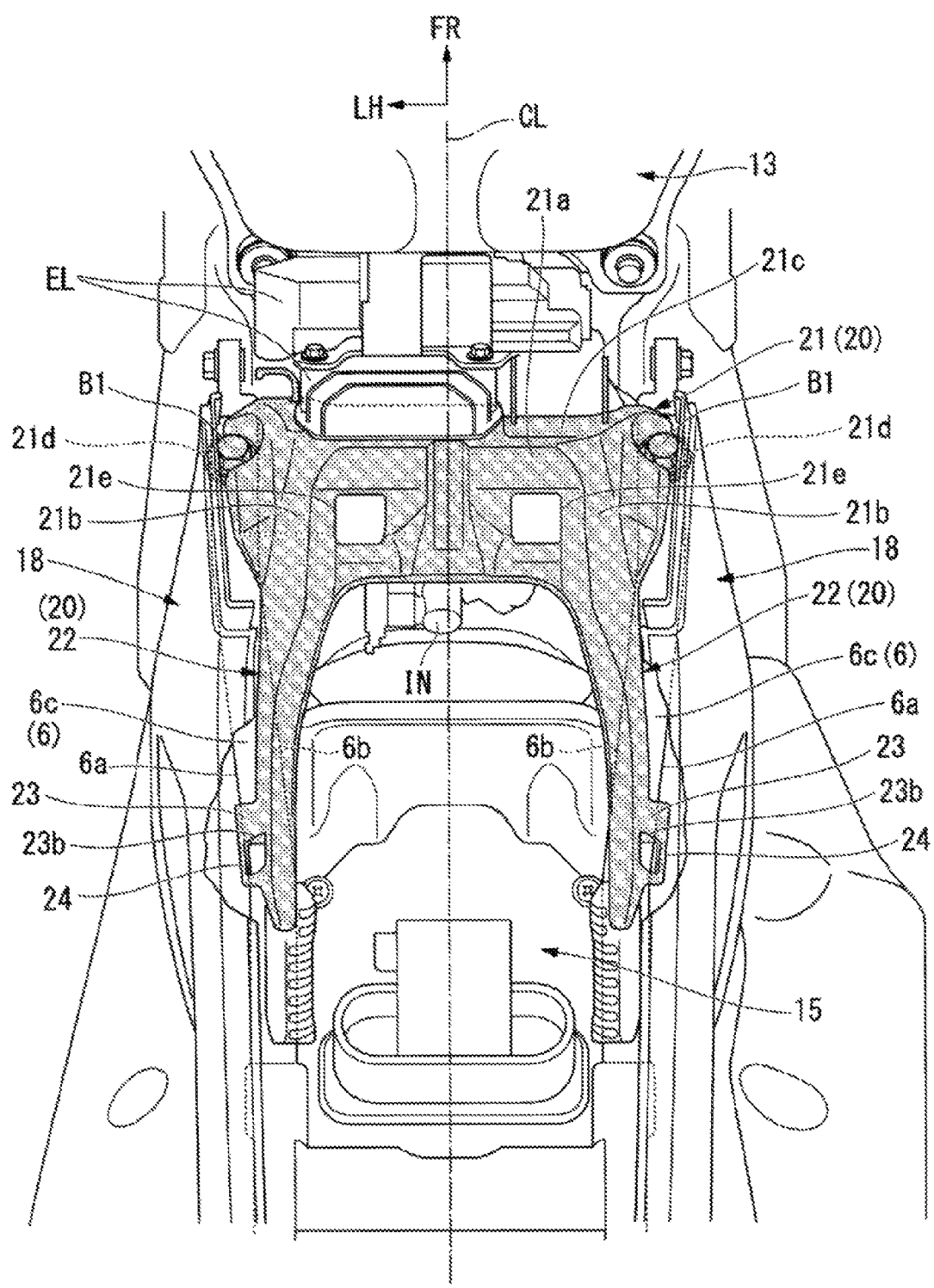
FIG. 3 is a top view of the main part of the motorcycle.
Figure 4:
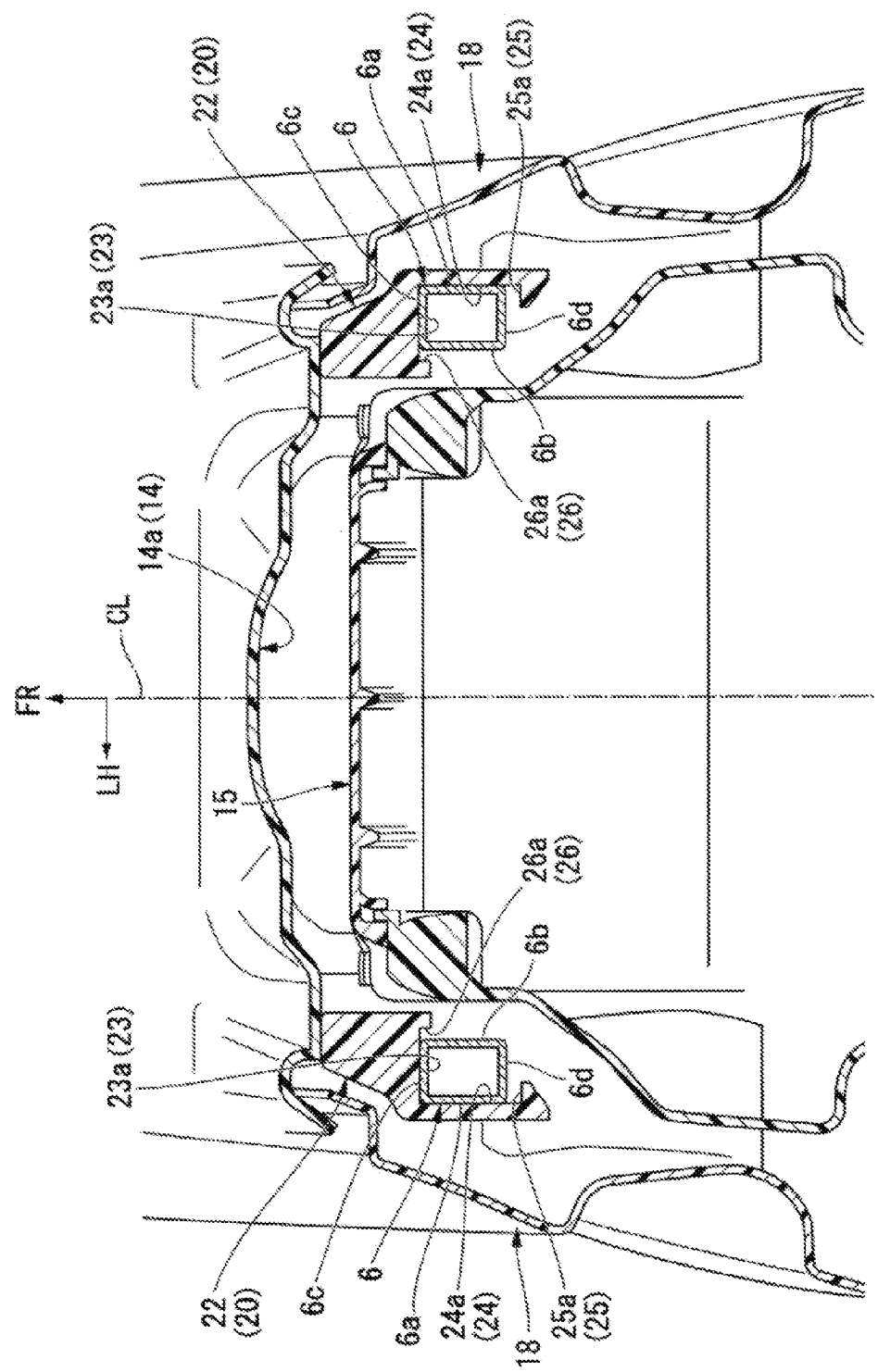
FIG. 4 is a cross-sectional view taken along IV-IV of FIG. 2.

Referring to FIGS. 2 to 4, the right and left seat frames 6 are formed into square pipes, and extend in the longitudinal direction. The right and left seat frames 6 have: outer and inner side surfaces 6a, 6b on outer and inner sides in the vehicle width direction (lateral direction), which are substantially perpendicular to the lateral direction and formed along the vertical direction; an upper surface 6c bridged across the upper ends of the outer and inner side surfaces 6a, 6b along the lateral direction; and a lower surface 6d bridged across the lower ends of the outer and inner side surfaces 6a, 6b along the lateral direction. Hereinafter, the outer side surface 6a will be referred to as a first side surface 6a, and the inner side surface 6b will be referred to as a second side surface 6b. Both of the side surfaces 6a, 6b are vertical surfaces extending from upper to lower of the seat frame 6.

In side view, the seat frame 6 is provided as a straight line tilted downward toward the front. A front end part of the seat frame 6 is joined to a rear end part of the main frame 4, by bolt fastening. The seat frame 6, a bottom plate 14a of the seat 14, and the fuel tank 13 are arranged such that they surround a substantially triangular space K1 in side view. The seat supporting member 20 is provided in the space K1.

The seat supporting member 20 supports a middle part in the longitudinal direction of the bottom plate 14a of the seat 14. The seat supporting member 20 is supported on the right and left seat frames 6. The seat supporting member 20 is attached to the right and left seat frames 6 in a detachable manner. The seat supporting member 20 is formed such that its height gradually increases toward the front in side view.

The seat supporting member 20 includes a base portion 21 spanning the paired right and left seat frames 6 in a front part thereof; and paired right and left extension portions 22, which are displaceable in the lateral direction, and extend rearward along the paired right and left seat frames 6, respectively, from the base portion 21. The seat supporting member 20 is an integrally molded part made of synthetic resin. The seat supporting member 20 is formed of light and strong fiber reinforced polymer or other materials, for example. The right and left extension portions 22 are displaceable in such a manner as to come close to and separate from each other, by being deflected (elastically deformed) laterally relative to the base portion 21.

The base portion 21 is formed into a box shape including an upper wall portion 21a, right and left side wall portions 21b, and a front wall portion 21c. Bolt insertion portions 21d, which project outward in the lateral direction, are formed in front lower end parts of the right and left side wall portions 21b. The right and left bolt insertion portions 21d are respectively fastened to the upper surfaces 6c in front parts of the right and left seat frames 6, with fastening bolts B1 inserted from above. This fastens and fixes the base portion 21, and therefore the front part of the seat supporting member 20, to the right and left seat frames 6.

The upper wall portion 21a of the base portion 21 is provided long in the lateral direction. The upper wall portion 21a is provided with paired right and left locking hole forming portions 21e, with which paired right and left locking claws 14b protruding from the bottom plate 14a of the seat 14 are engaged.

The front wall portion 21c of the base portion 21 is a fixing part for attaching electric equipment EL, for example. An ECU, a relay switch, and a regulator are examples of the electric equipment EL.

A fuel injection system IN of the engine 10 is arranged on the inner side of the base portion 21. The air cleaner 15 is arranged behind the fuel injection system IN. An upper part of the air cleaner 15 is arranged between the right and left extension portions 22 in the rear part of the seat supporting member 20, between the right and left seat frames 6. The front wall portion 21c of the base portion 21 is provided in the deepest part of the space K1.

Referring to FIGS. 2, and 5 to 7, in a rear part of each of the paired right and left extension portions 22, there are: an upper locking portion 23 placed on top of the seat frame 6; a first lateral locking portion 24 extending downward from one side in the lateral direction of the upper locking portion 23, and arranged such that it can come into contact with the first side surface 6a on one side in the lateral direction (outer side in the vehicle width direction) of the seat frame 6; a lower locking portion 25 extending to the other side in the lateral direction from the lower end of the first lateral locking portion 24, and arranged below the seat frame 6 with a gap D2 formed therebetween in the vertical direction; and a second lateral locking portion 26 extending downward from the other side in the lateral direction of the upper locking portion 23, for the same distance as the gap D2 or for a shorter distance than the gap D2, and arranged such that it can come into contact with the second side surface 6b on the other side in the lateral direction (inner side in the vehicle width direction) of the seat frame 6.

The upper locking portion 23 protrudes downward from a lower surface of a rear part of the extension portion 22. The upper locking portion 23 extends outward in the lateral direction in the rear part of the extension portion 22. The upper locking portion 23 is formed into a rectangular solid whose longitudinal direction coincides with that of the extension portion 22. The upper locking portion 23 has a lower surface 23a formed along the upper surface 6c of the seat frame 6. The upper locking portion 23 brings its lower surface 23a into contact (lock) with the upper surface 6c of the seat frame 6, to thereby transmit load inputted from the seat 14, to the seat frame 5.

The first lateral locking portion 24 extends vertically downward from the outer end in the lateral direction of the upper locking portion 23, along the first side surface 6a on the outer side in the lateral direction of the seat frame 6. The first lateral locking portion 24 brings its first locking surface 24a on the inner side in the lateral direction into contact (lock) with the first side surface 6a of the seat frame 6. Note that a gap may be formed between the first locking surface 24a of the first lateral locking portion 24 and the first side surface 6a of the seat frame 6. The first lateral locking portion 24 is formed such that the lower end of a rear part thereof protrudes downward in side view.

The lower locking portion 25 protrudes inward in the lateral direction from the lower end of the rear part of the first lateral locking portion 24. The lower locking portion 25 has an upper surface 25a, which is arranged below the lower surface 6d of the seat frame 6 with the gap D2 formed therebetween. The lower locking portion 25 overlaps with the outer side in the lateral direction of the seat frame 6, in plan view. The gap D2, and a protrusion amount L2 of the lower locking portion 25 toward the inner side in the lateral direction will be described later in detail.

The seat supporting member 20 is molded integrally by use of a vertically parted mold. The lower locking portion 25 overhangs the part for forming the first lateral looking portion 24. In order to form this lower locking portion 25, a mold removal portion 23b is formed in a rear part of the upper locking portion 23, in such a manner as to vertically penetrate the upper locking portion toward the lower locking portion 25.

The second lateral locking portion 26 extends vertically downward from the inner end in the lateral direction of a front part of the upper locking portion 23, along the second side surface 6b on the inner side in the lateral direction of the seat frame 6. The second lateral locking portion 26 has a second locking surface 26a on the outer side in the lateral direction, which is arranged close to the second side surface 6b of the seat frame 6 with a gap L1 formed therebetween. Note that the second locking surface 26a of the second lateral locking portion 26 and the second side surface 6b of the seat frame 6 may be brought into contact (lock) with each other.

The second lateral locking portion 26 is provided in such a manner as to avoid the lower locking portion 25, in the longitudinal direction. Specifically, the second lateral locking portion 26 is separated toward the base portion 21 from the lower locking portion 25, in the longitudinal direction. The upper locking portion 23 stops widening outward in the lateral direction, in the part where the second lateral locking portion 26 is formed.

A downward protrusion amount D1 of the second lateral locking portion 26, is the same or smaller than the gap D2 between the upper surface 25a of the lower locking portion 25 and the lower surface 6d of the seat frame 6. Hence, when the extension portion 22 is moved upward (see FIG. 9(*a*)) until the lower locking portion 25 comes into contact with the seat frame 6, the second lateral locking portion 26 is moved to a point higher than the seat frame 6, so that the lock of the second lateral locking portion 26 on the seat frame 6 is released.

Also, ever, if the gap D2 between the lower locking portion 25 and the seat frame 6 is small, rotating the seat supporting member 20 about the lower locking portion 25 in such a manner as to lift the base portion 21 side of the seat supporting member 20 (see FIG. 8) as will be mentioned later allows the second lateral locking portion 26, which is separated toward the base portion 21 from the lower locking portion 25 in the longitudinal direction, to move upward, so that the lock of the second lateral locking portion 26 on the seat frame 6 is released.

In addition, the protrusion amount L2 of the lower locking portion 25 toward the inner side in the lateral direction, is larger than the maximum gap L1 formed between the second locking surface 26a of the second lateral locking portion 26 and the second side surface 6b of the seat frame 6. Note that the maximum gap L1 is the gap formed when the first locking surface 24a of the first lateral locking portion 24 and the first side surface 6a of the seat frame 6 come into contact with each other, since the protrusion amount L2 of the lower locking portion 25 is set larger than the maximum gap L1, the lower locking portion 25 can still lock onto the seat frame 6 from below, even when the extension portion 22 and the seat frame 6 are displaced in the lateral direction to the extent that the second locking surface 26a of the second lateral locking portion 26 and the second side surface 6b of the seat frame 6 come into contact with each other. In other words, the extension portion 22 is restricted from moving up farther than the gap D2, and is thereby kept from falling off the seat frame 6.

Although the upper surface 25a (locking surface) of the lower locking portion 25 is formed by using the mold removal portion 23b of the upper locking portion 23 in this embodiment, it can also be formed by moving a slide mold toward the inner side in the lateral direction. The mold design using the slide mold is made possible, because the second lateral locking portion 26 is provided in such a manner as to avoid the lower locking portion 25 in the longitudinal direction.

The part attachment structure of a straddle type vehicle of the embodiment is configured in the above manner. Next, an explanation will be given of the operation of the part attachment structure.

Referring to FIGS. 2 to 4, when the seat supporting member 20 is attached to the body frame 2, the base portion 21 is fastened and fixed to the right and left seat frames 6, and the right and left extension portions 22 are placed on the right and left seat frames 6 while being restricted from moving in the lateral direction. Each of the extension portions 22 is kept from falling off the seat frame 6, by receiving load such as the own weight of the seat supporting member 20 and input from the seat 14, with the upper locking portion 23 placed on the upper surface 6c of the seat frame 6, and both of the lateral locking portions 24, 26 locked onto both of the side surfaces 6a, 6b of the seat frames 6, respectively. Upward movement of each extension portion 22 is restricted by the load, and even if the extension portion 22 is lifted, the amount of its upward movement is limited within the gap D2 by the lower locking portion 25.

Figure 5:
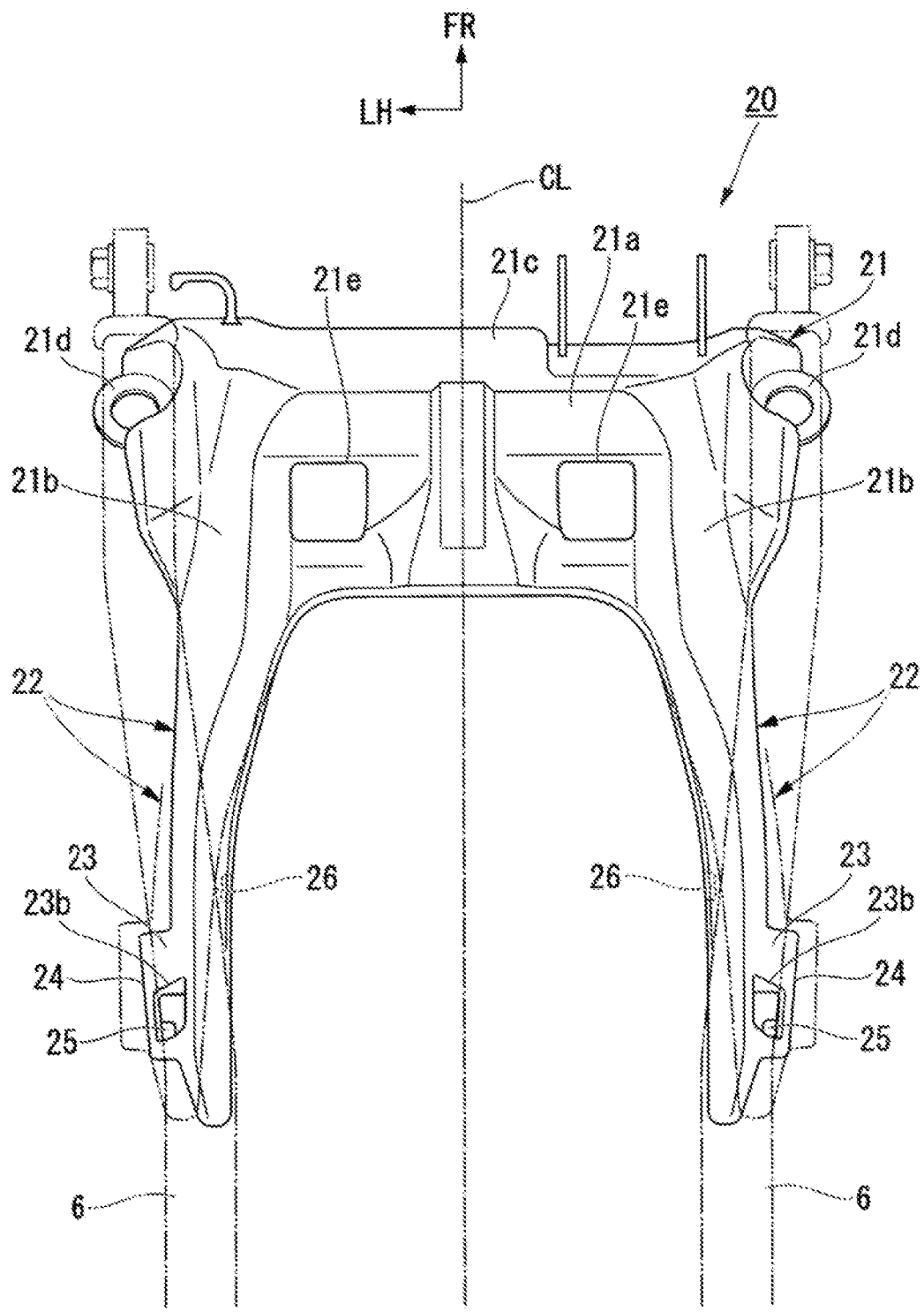
FIG. 5 is a top view of a seat supporting member of the motorcycle.
Figure 8:
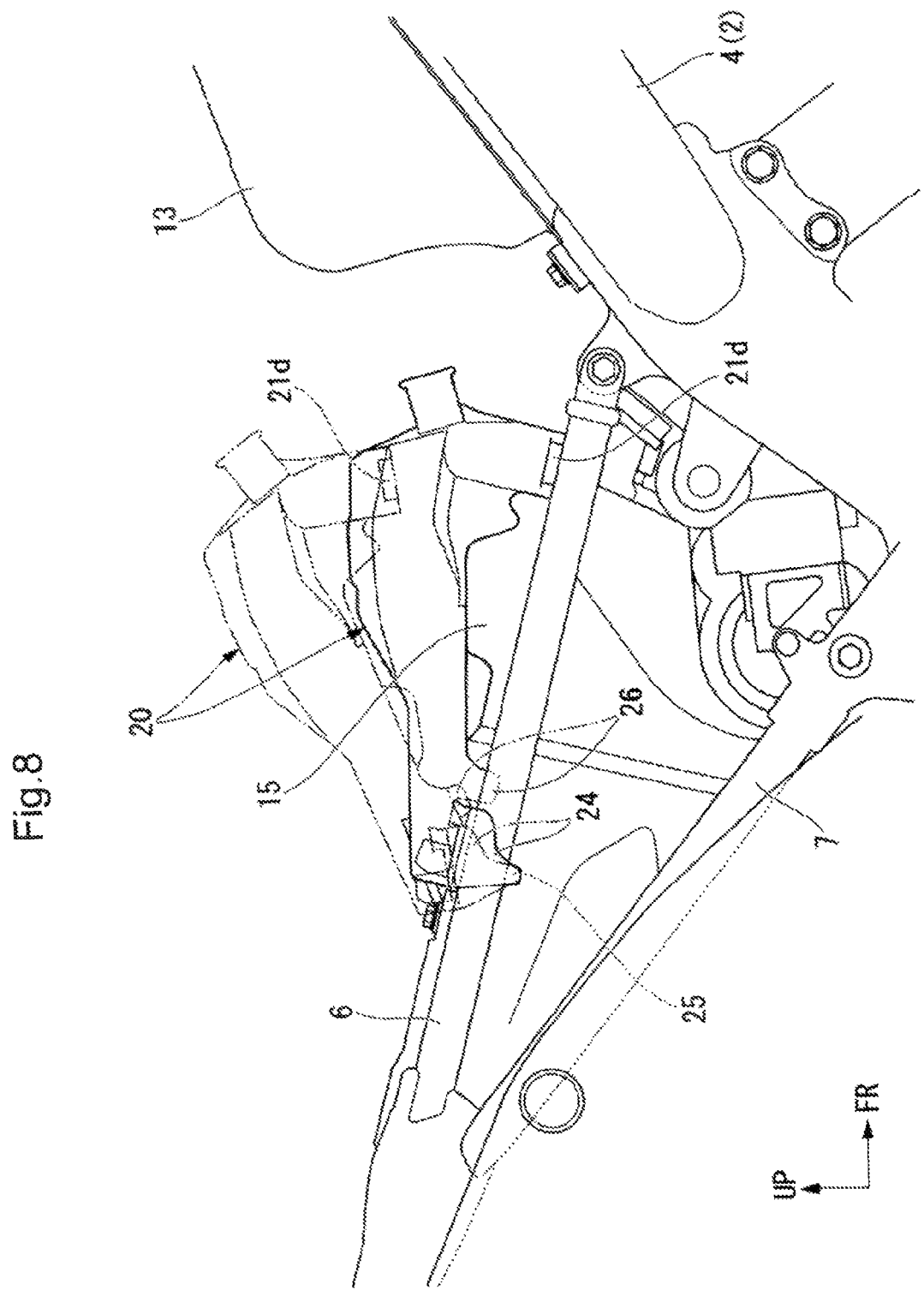
FIG. 8 is a right side view for describing a detachment procedure of the seat supporting member.

Referring to FIGS. 5, 8, and 9(*a*), 9(*b*), when detaching the seat supporting member 20 from the body frame 2, first, fastening of the base portion 21 is released, and the extension portion 22 is lifted until the lower locking portion 25 comes into contact with the lower surface 6d of the seat frame 6. In the embodiment, the seat supporting member 20 is rotated (see FIG. 8) about the lower locking portion 25, in such a manner as to lift the base portion 21 side of the seat supporting member 20. Note that the rotation of the seat supporting member 20 is indicated by a dotted line in FIG. 8. Although the electric equipment EL is not shown in FIG. 8, the seat supporting member 20 can be detached with the electric equipment EL attached thereto.

When lifting the extension portion 22, both the lateral locking portions 24, 26 are in sliding contact with both of the side surfaces 6a, 6b formed along the vertical direction of the seat frames 6, so that vertical movement of the extension portion 22 is guided. When the extension portion 22 is lifted, the second lateral locking portion 26 moves upward, and when the second lateral locking portion 26 reaches a point higher than the seat frame 6, the lock of the second lateral locking portion 26 on the second side surface 6b of the seat frame 6 is released (see FIG. 9(*a*)).

In this state, each of the extension portions 22 is elastically deformed to be displaced to the first side surface 6a side (the opposite side of the second lateral locking portion 26 in the lateral direction, first lateral locking portion 24 side) of the seat frame 6. This further releases the lock of the lower locking portion 25 on the lower surface 6d of the seat frame 6 (see FIG. 5 and FIG. 9(*b*)). Note that the outward elastic deformation of the extension portion 22 in the lateral direction is indicated by a dotted line in FIG. 5.

By lifting the right and left extension portions 22 in this state, the right and left extension portions 22 can be detached from the seat frames 6, and the entire seat supporting member 20 can be detached from the body frame 2.

Thus, in the right and left extension portions 22, the lock on the seat frames 6 is released only by moving the extension portions 22 in two directions, and release of fastening is unnecessary. Then, by lifting the right and left extension portions 22, and therefore the entire seat supporting member 20, the seat supporting member 20 can be detached from the body frame 2.

Also, the seat supporting member 20 is attached to the body frame 2 by reversing the above procedure, and locking the right and left extension portions 22 onto the right and left seat frames 6, and then fastening and fixing the base portion 21 to the right and left seat frames 6. Since the load is applied when the at supporting member 20 is attached to the body frame 2, the lock of the lower locking portion 25 and both of the lateral locking portions on the seat frames 6 is not released, and the extension portions 22 can be kept from accidentally falling off.

As has been described, according to the part attachment structure of a straddle type vehicle of the embodiment, the seat supporting member 20 includes the base portion 21 spanning the paired right and left seat frames 6, and the paired right and left extension portions 22, which are displaceable in the lateral direction, and extend in the longitudinal direction along the paired right and left seat frames 6, respectively, from the base portion 21; the base portion 21 is fixed by being fastened to the body frame 2; each of the paired right and left extension portions 22 includes the upper locking portion 23, both of the lateral locking portions 24, 26, and the lower locking portion 25; and the lock on the seat frames 6 is engaged or released by only moving the extension portions 22 in two directions. Hence, the seat supporting member 20 can be securely attached to the body frame 2 through less work of attaching and detaching fasteners such as bolts, and attachment and detachment can be facilitated.

Also, in each seat frame 6, the first side surface 6*a* and the second side surface 6*b* onto which the respective lateral locking portions 24, 26 are locked are vertical surfaces, which are formed along the vertical direction and extend to the upper end of the seat frame 6. Hence, the respective lateral locking portions 24, 26 can be locked onto both of the side surfaces 6*a*, 6*b* extending vertically downward from the upper end of the seat frame 6, whereby lateral movement of the extension portion 22 can be restricted favorably. Also, the extension portions 22, and therefore the entire seat supporting member 20 cam be moved vertically along both of the side surfaces 6*a*, 6*b* of the seat frames 6, so that the seat supporting member 20 can be attached and detached easily.

Also, since the seat supporting member 20 is arranged below the seat 14, the bifurcated seat supporting member 20 is less exposed, so that appearance can be improved, and the extension portions 22 can be kept from being thrown off the seat frames 6 by unintentional external pressure applied thereon.

Also, the seat supporting member 20 is an integrally molded part made of resin, and is provided in such a manner as to avoid the lower locking portion 25 in the longitudinal direction. Hence, the second lateral locking portion 26 and the lower locking portion 25 are less likely to block removal of each other's mold, and therefore the second lateral locking portion 26 and the lower locking portion 25 can be formed more easily.

Also, the second lateral locking portion 26 is separated toward the base portion 21 from the lower locking portion 25. Hence, when releasing the lock of the second lateral locking portion 26, first, the seat supporting member 20 is rotated about the lower locking portion 25 in such a manner as to lift the base portion 21 side of the seat supporting member 20. This releases the lock of the second lateral locking portion 26 on the frame side surface 6*b*, the second lateral locking portion being separated toward the base portion 21 from the lower locking portion 25. By moving the extension portion 22 in the lateral direction in this state, the lock of the lower locking portion 25 on the frame lower surface 6*d* is released. Since the lock of the second lateral locking portion 26 is released by thus using the rotation of the seat supporting member 20, the lock of the second lateral locking portion 26 can be released without separating the lower locking portion 25 largely from the seat frame 6.

Also, the air cleaner 15 is provided between the paired right and left seat frames 6; and the second lateral locking portion 26 extends downward from the inner side in the lateral direction of the upper locking portion 23, and locks onto the second side surface 6*b* on the inner side in the lateral direction of the seat frame 6. Hence, when releasing the lock of the lower locking portion 25 after releasing the lock of the second lateral locking portion 25, the extension portion 22 is displaced outward in the lateral direction. Accordingly, there is no need to secure a margin on the air cleaner 15 side to move the extension portion 22, so that the largest possible volume of the air cleaner 15 can be secured.

Also, the base portion 21 includes the bolt insertion portions 21*d* into which the fastening bolts B1 are insertable, as fastening parts to be fastened to the body frame 2 with the fastening bolts B1. Hence, the configuration of the fastening part of the base portion 21 is simplified, and therefore the seat supporting member 20 can be lifted more easily, and can be attached and detached smoothly.

Figure 11:
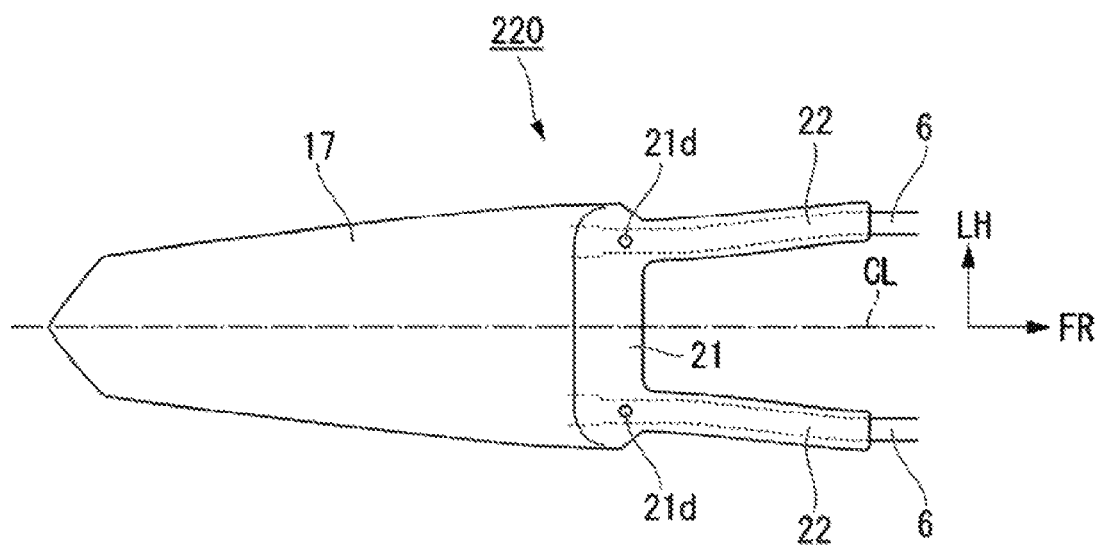
FIG. 11 is a top view of a second modification of the seat supporting member.

Note that the present invention is not limited to the above embodiment, and is applicable to attachment and detachment of detachable parts having various configurations such as: a seat supporting member 120 integrated with side covers 10 as in FIG. 10, a seat supporting member 220 integrated with a rear fender 17 as in FIG. 11, and a configuration integrated with an unillustrated tank cover. The paired right and left extension portions 22 of the detachable part may be configured to extend frontward from the base portion 21 (see FIG. 11).

The paired right and left extension portions 22 do not necessarily have to be deformed elastically, as long as they are displaceable in such a manner as to come close to and separate from each other. Hence, the paired right and left extension portions may have mechanical movable parts such as hinged structures, or the movable part may be provided only in one of the extension portions 22 to be displaceable. The base portion 21 does not necessarily have to be fastened to the right and left seat frames 6, and may be fastened to an appropriate part of the body frame 2 including the main frames 4 and other parts. The fastening part of the base portion 21 is not limited to the bolt insertion portions 21*d*, and may be a fastening part including bolts or nuts. The invention is not limited to the configuration in which the extension portions 22 separated to the right and left are provided with the locking portions 23 to 26. A base portion 21 in which right and left parts are integrated may also be employed, by using deflection in the lateral direction, for example, to provide configurations corresponding to the locking portions 23 to 25 instead of the fastening parts. The detachable part is not limited to an integrally molded part, and may be formed of multiple members, and also does not necessarily have to be made of resin, and may include metal parts such as iron and aluminum, or may be formed of metal parts.

The detachable part may be configured such that the first lateral locking portion 24 leading to the lower locking portion 25 is arranged on the inner side in the lateral direction of the seat frame 6, and the right and left extension portions 22 are displaced inward in the lateral direction when attaching and detaching the right and left extension portions 22. The paired right and left frame members for attaching the detachable part is not limited to the seat frames 6, and may be the main frames 4, the support frames 7, or other frames. The frame member is not limited to the shape having a rectangular cross section, and may include curved surfaces such as a circular surface. The vehicle part to be supported by the detachable part is not limited to the seat 14, and may be various exterior parts, electric parts, intake and exhaust system parts, and fuel system parts, for example. The volume securement part between the right and left frame members is not limited to the air cleaner 15, and may be a storage part for various articles, for example.

The straddle type vehicle includes general vehicles that the rider rides by straddling the vehicle body, and includes not only motorcycles (including a motor bicycle and a scooter type vehicle) but also three-wheeled (including vehicles two-wheeled at the front and single-wheeled at the rear, as well as those single-wheeled at the front and two-wheeled at the rear) or four-wheeled vehicles.

The configuration of the above embodiment is only an example of the present invention, and various modifications can be made without departing from the gist of the invention, such as replacing components of the embodiment with known components.

What is claimed is:

1. A part attachment structure of a straddle type vehicle comprising:
    a body frame having paired right and left frame members, each extending in a longitudinal direction of the vehicle; and
    a detachable part supported by said paired right and left frame members, wherein:
    said detachable part includes a base portion spanning said right and left frame members, and paired right and left extension portions, the right and left extension portions extending from the base portion in the longitudinal direction along said right and left frame members, respectively, and being displaceable in a width direction of the vehicle,
    said base portion is fixed to said body frame by being fastened to the body frame, and
    each of said paired right and left extension portions includes:
        an upper locking portion placed on corresponding one of the frame members,
        a first lateral locking portion extending downward from one side of said upper locking portion in the lateral direction, and arranged so as to face a first side surface of the corresponding one of said frame members located on one side in the lateral direction of the corresponding one of said frame members so as to be able to come into contact with the first side surface,
        a lower locking portion extending from a lower end of said first lateral locking portion toward the other side in the lateral direction, and arranged under the corresponding one of said frame members with a first vertical gap therebetween in the vertical direction, and
        a second lateral locking portion extending downward from the other side in the lateral direction of said upper locking portion, with a vertical length equal to or less than the first vertical gap, and arranged so as to face a second side surface of the corresponding one of said frame members located on the other side in the lateral direction of the corresponding one of said frame members so as to be able to come into contact with the second side surface.

2. The part attachment structure of a straddle type vehicle according to claim 1, wherein
    said first side surface and second side surface onto which said respective lateral locking portions are locked are vertical surfaces, which are formed along the vertical direction and extend to an upper end of said respective frame members.

3. The part attachment structure of a straddle type vehicle according claim 1 further comprising a seat on which a rider sits, wherein
    said detachable part is disposed under said seat.

4. The part attachment structure of a straddle type vehicle according to claim 1, wherein:
    said detachable part is an integrally molded part made of resin; and
    said second lateral locking portion is provided at a position different from a position of said lower locking portion in the longitudinal direction.

5. The part attachment structure of a straddle type vehicle according to claim 4, wherein
    said second lateral locking portion is separated from said lower locking portion toward said base portion.

6. The part attachment structure of a straddle type vehicle according to claim 1, comprising a volume securement part between said paired right and left frame members, wherein
    said second lateral locking portion extends downward from an inner side in the lateral direction of said upper locking portion, and locks onto said second side surface located on the inner side in the lateral direction of said frame member.

7. The part attachment structure of a straddle type vehicle according to claim 1, wherein:
    said base portion includes a fastening part to be fastened to said body frame with a fastening bolt; and
    said fastening part is a bolt insertion portion into which said fastening bolt is inserted.

8. The part attachment structure of a straddle type vehicle according to claim 4, wherein
    said second lateral locking portion is disposed between said lower locking portion and said base portion in the longitudinal direction.

9. The part attachment structure of a straddle type vehicle according to claim 1, wherein the right and left extension portions elastically deformable in the width direction of the vehicle.

10. The part attachment structure of a straddle type vehicle according to claim 1, wherein the right and left extension portions constitute a clamp structure to clamp said paired right and left frame members.

11. The part attachment structure of a straddle type vehicle according to claim 1, wherein the lower locking portion includes a jaw structure, and the first vertical gap is a gap between the jaw structure and a bottom surface of the corresponding one of the frame members.

12. The part attachment structure of a straddle type vehicle according to claim 1, wherein said paired right and left frame members each have a rectangular outer shape in cross-section.

13. The part attachment structure of a straddle type vehicle according to claim 1, wherein the first lateral locking portion has a vertical length becoming longer toward a rear of the vehicle, the lower locking portion extending from the lower end of the first lateral locking portion.

14. A straddle type vehicle comprising a part attachment structure, the part attachment structure comprising:
    a body frame having paired right and left frame members, each extending in a longitudinal direction of the vehicle; and
    a detachable part supported by said paired right and left frame members, wherein:

said detachable part includes a base portion spanning said right and left frame members, and paired right and left extension portions, the right and left extension portions extending from the base portion in the longitudinal direction along said right and left frame members, respectively, and being displaceable in a width direction of the vehicle, said base portion is fixed to said body frame by being fastened to the body frame, and each of said paired right and left extension portions includes:

an upper locking portion placed on corresponding one of the frame members, a first lateral locking portion extending downward from one side of said upper locking portion in the lateral direction, and arranged so as to face a first side surface of the corresponding one of said frame members located on one side in the lateral direction of the corresponding one of said frame members so as to be able to come into contact with the first side surface, a lower locking portion extending from a lower end of said first lateral locking portion toward the other side in the lateral direction, and arranged under the corresponding one of said frame members with a first vertical gap therebetween in the vertical direction, and a second lateral locking portion extending downward from the other side in the lateral direction of said upper locking portion, with a vertical length equal to or less than the first vertical gap, and arranged so as to face a second side surface of the corresponding one of said frame members located on the other side in the lateral direction of the corresponding one of said frame members so as to be able to come into contact with the second side surface.

* * * * *